United States Patent
Chung et al.

(10) Patent No.: US 8,407,493 B2
(45) Date of Patent: Mar. 26, 2013

(54) METHOD OF SUPPLYING POWER FOR A DEVICE WIRED ADAPTER, AND WIRELESS UNIVERSAL SERIAL BUS COMMUNICATION SYSTEM

(75) Inventors: Chang-Mo Chung, Yongin-si (KR); Yon-Suk Kim, Daejeon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 361 days.

(21) Appl. No.: 12/700,465

(22) Filed: Feb. 4, 2010

(65) Prior Publication Data

US 2010/0211805 A1 Aug. 19, 2010

(30) Foreign Application Priority Data

Feb. 18, 2009 (KR) .................. 10-2009-0013338

(51) Int. Cl.
*G06F 1/26* (2006.01)
*G06F 15/177* (2006.01)

(52) U.S. Cl. ................... 713/300; 713/1; 713/100

(58) Field of Classification Search ........... 713/300–340
See application file for complete search history.

(56) References Cited

U.S. PATENT DOCUMENTS

| 2005/0086389 | A1 | 4/2005 | Chang | |
|---|---|---|---|---|
| 2006/0212611 | A1* | 9/2006 | Fujii et al. | 710/16 |
| 2007/0032098 | A1* | 2/2007 | Bowles et al. | 439/11 |
| 2008/0005395 | A1* | 1/2008 | Ong et al. | 710/36 |
| 2009/0006686 | A1* | 1/2009 | Kimura | 710/106 |

FOREIGN PATENT DOCUMENTS

| JP | 2006-164081 | 6/2006 |
|---|---|---|
| KR | 1020010107389 | 12/2001 |

* cited by examiner

*Primary Examiner* — Dennis M Butler
(74) *Attorney, Agent, or Firm* — F. Chau & Associates, LLC

(57) ABSTRACT

In a method of supplying power for a device wired adapter, a stand-alone USB device is connected to the device wired adapter for operating as a wireless USB device. The stand-alone USB device is set as a USB on-the-go host. The device wired adapter is set as a USB on-the-go device. Power is supplied to the device wired adapter by the stand-alone USB device. A USB on-the-go role of the device wired adapter is swapped with a USB on-the-go role of the stand-alone USB device.

18 Claims, 5 Drawing Sheets

METHOD OF SUPPLYING POWER FOR A DEVICE WIRED ADAPTER, AND WIRELESS UNIVERSAL SERIAL BUS COMMUNICATION SYSTEM

CROSS-REFERENCE TO RELATED APPLICATION(S)

This application claims priority benefit under 35 USC §119 to Korean Patent Application No. 2009-0013338, filed on Feb. 18, 2009, in the Korean Intellectual Property Office (KIPO), the disclosure of which is incorporated by reference herein in its entirety.

BACKGROUND

1. Technical Field

Exemplary embodiments relate to a wireless universal serial bus (USB) communication system, and more particularly to a method of supplying power for a device wired adapter (DWA) in the wireless universal serial bus (USB) communication system.

2. Description of the Related Art

USB is a bus standard which provides a plug-and-play interface between a main device such as a computer and peripheral devices such as a joystick, a keyboard, a scanner, a printer, etc. USB communication is widely used for computers because USB communication offers a fast data transfer rate and a chain link among peripheral devices of computers. In a wired USB communication system, the computer and peripheral devices communicate while the computer peripherals are physically connected to the computer. Because they are physically connected, the computer—acting as the USB host—can supply power to the computer peripherals.

An alternative to a wired USB communication system is a wireless USB communication system. In a wireless USB communication system, a wireless USB host communicates wirelessly with wireless USB devices. However, in a wireless USB communication system, the wireless USB host cannot supply power to the wireless USB devices since the wireless USB host and the wireless USB devices are not physically connected. As a result, the wireless USB devices must receive power from another source, such as, for example, an internal battery or an electrical outlet, which may inconvenience the user. Similarly, a device wired adapter (DWA), which may be used in a wireless USB communication system to enable a wired USB device to operate as a wireless USB device, requires power from another source such as an internal battery or an electrical outlet, thus limiting the ability to use the device wired adapter as a wireless dongle.

Therefore, a need exists for a method of supplying power to a device wired adapter without requiring an additional power source that limits the ability to use the device wired adapter as a wireless dongle.

SUMMARY

Exemplary embodiments provide a method of supplying power for a device wired adapter, capable of allowing the device wired adapter to operate without any external power (e.g., power supplied from an internal battery or power supplied from an electrical outlet) by sharing power of a stand-alone USB device connected to the device wired adapter.

Exemplary embodiments provide a wireless USB communication system employing the method of supplying power for the device wired adapter.

According to an exemplary embodiment, a method of supplying power for a device wired adapter comprises, connecting a stand-alone universal serial bus (USB) device to the device wired adapter, wherein the stand-alone USB device operates as a wireless USB device, setting the stand-alone USB device as a USB on-the-go host, and setting the device wired adapter as a USB on-the-go device.

In an exemplary embodiment, the USB on-the-go role of the device wired adapter is swapped with the USB on-the-go role of the stand-alone USB device by changing the USB on-the-go role of the device wired adapter from the USB on-the-go device to the USB on-the-go host, and the USB on-the-go role of the stand-alone USB device from the USB on-the-go host to the USB on-the-go device.

In an exemplary embodiment, the device wired adapter may provide a wireless communication path between the stand-alone USB device and a wireless USB host, allowing the stand-alone USB device to operate as the wireless USB device.

In an exemplary embodiment, the stand-alone USB device may continue to supply power to the device wired adapter after the USB on-the-go role of the device wired adapter is swapped with the USB on-the-go role of the stand-alone USB device.

In an exemplary embodiment, the USB on-the-go host may control the USB on-the-go device according to a USB on-the-go interface.

According to an exemplary embodiment, a method of supplying power for a device wired adapter comprises connecting a stand-alone USB device to the device wired adapter for operating as a first wireless USB device. The stand-alone USB device may be set as a first USB on-the-go host. The device wired adapter may be set as a first USB on-the-go device. A non-stand-alone USB device may be connected to the device wired adapter for operating as a second wireless USB device. The non-stand-alone USB device may be set as a second USB on-the-go device. The device wired adapter may be set as a second USB on-the-go host. Power may be supplied to the device wired adapter and the non-stand-alone USB device by the stand-alone USB device. A USB on-the-go role of the device wired adapter is swapped with a USB on-the-go role of the stand-alone USB device.

In an exemplary embodiment, the first USB on-the-go host may control the first USB on-the-go device according to a USB on-the-go interface, and the second USB on-the-go host may control the second USB on-the-go device according to the USB on-the-go interface.

In an exemplary embodiment, the USB on-the-go role of the device wired adapter is swapped with the USB on-the-go role of the stand-alone USB device by changing the USB on-the-go role of the device wired adapter from the first USB on-the-go device to the first USB on-the-go host, and the USB on-the-go role of the stand-alone USB device from the first USB on-the-go host to the first USB on-the-go device.

In an exemplary embodiment, the device wired adapter may provide a wireless communication path between the stand-alone USB device, the non-stand-alone USB device and a wireless USB host, allowing the stand-alone USB device to operate as the first wireless USB device, and the non-stand-alone USB device to operate as the second wireless USB device.

In an exemplary embodiment, the stand-alone USB device may continue to supply power to the device wired adapter and the non-stand-alone USB device after the USB on-the-go role of the device wired adapter is swapped with the USB on-the-go role of the stand-alone USB device.

According to an exemplary embodiment, a wireless USB communication system may include a wireless USB host that communicates with a wireless USB device, and a stand-alone USB device that operates as the wireless USB device upon being connected to a device wired adapter by a USB on-the-go interface. The stand-alone USB device may supply power to the device wired adapter upon the USB on-the-go interface setting the stand-alone USB device as a first USB on-the-go host, and the device wired adapter as a first USB on-the-go device.

In an exemplary embodiment, the USB on-the-go interface may set a USB on-the-go role of the device wired adapter and a USB on-the-go role of the stand-alone USB device based on connection tabs of the device wired adapter and the stand-alone USB device.

In an exemplary embodiment, the USB on-the-go interface may swap a USB on-the-go role of the device wired adapter with a USB on-the-go role of the stand-alone USB device upon the stand-alone USB device supplying power to the device wired adapter.

In an exemplary embodiment, the USB on-the-go interface may swap the USB on-the-go role of the device wired adapter with the USB on-the-go role of the stand-alone USB device by changing the USB on-the-go role of the device wired adapter from the first USB on-the-go device to the first USB on-the-go host, and the USB on-the-go role of the stand-alone USB device from the first USB on-the-go host to the first USB on-the-go device.

In an exemplary embodiment, the stand-alone USB device may continue to supply power to the device wired adapter after the USB on-the-go interface swaps the USB on-the-go role of the device wired adapter with the USB on-the-go role of the stand-alone USB device.

In an exemplary embodiment, the wireless USB communication system may further include a non-stand-alone USB device that operates as the wireless USB device upon being connected to the device wired adapter by the USB on-the-go interface. The stand-alone USB device may supply power to the non-stand-alone USB device through the device wired adapter upon the USB on-the-go interface setting the stand-alone USB device as the first USB on-the-go host, the non-stand-alone USB device as a second USB on-the-go device, and the device wired adapter as the first USB on-the-go device and a second USB on-the-go host.

In an exemplary embodiment, the non-stand-alone USB device may comprise a USB device not having an internal battery, and the stand-alone USB device may comprise a USB device having an internal battery.

In an exemplary embodiment, the USB on-the-go interface may swap a USB on-the-go role of the device wired adapter with a USB on-the-go role of the stand-alone USB device upon the stand-alone USB device supplying power to the non-stand-alone USB device through the device wired adapter.

In an exemplary embodiment, the USB on-the-go interface may swap the USB on-the-go role of the device wired adapter with the USB on-the-go role of the stand-alone USB device by changing the USB on-the-go role of the device wired adapter from the first USB on-the-go device to the first USB on-the-go host, and the USB on-the-go role of the stand-alone USB device from the first USB on-the-go host to the first USB on-the-go device.

In an exemplary embodiment, the stand-alone USB device may continue to supply power to the non-stand-alone USB device through the device wired adapter after the USB on-the-go interface swaps the USB on-the-go role of the device wired adapter with the USB on-the-go role of the stand-alone USB device.

According to an exemplary embodiment, a method of supplying a power for a device wired adapter may allow the device wired adapter to operate without any external power (e.g., a power supplied from an internal battery or a power supplied from an electric outlet) by sharing a power of a stand-alone USB device connected to the device wired adapter.

According to an exemplary embodiments a wireless USB communication system may be implemented using a device wired adapter that substantially operates as a wireless dongle by sharing a power of a stand-alone USB device connected to the device wired adapter.

BRIEF DESCRIPTION OF THE DRAWINGS

Illustrative, non-limiting exemplary embodiments will be more clearly understood from the following detailed description taken in conjunction with the accompanying drawings.

DETAILED DESCRIPTION OF THE EXEMPLARY EMBODIMENTS

Figure 1:
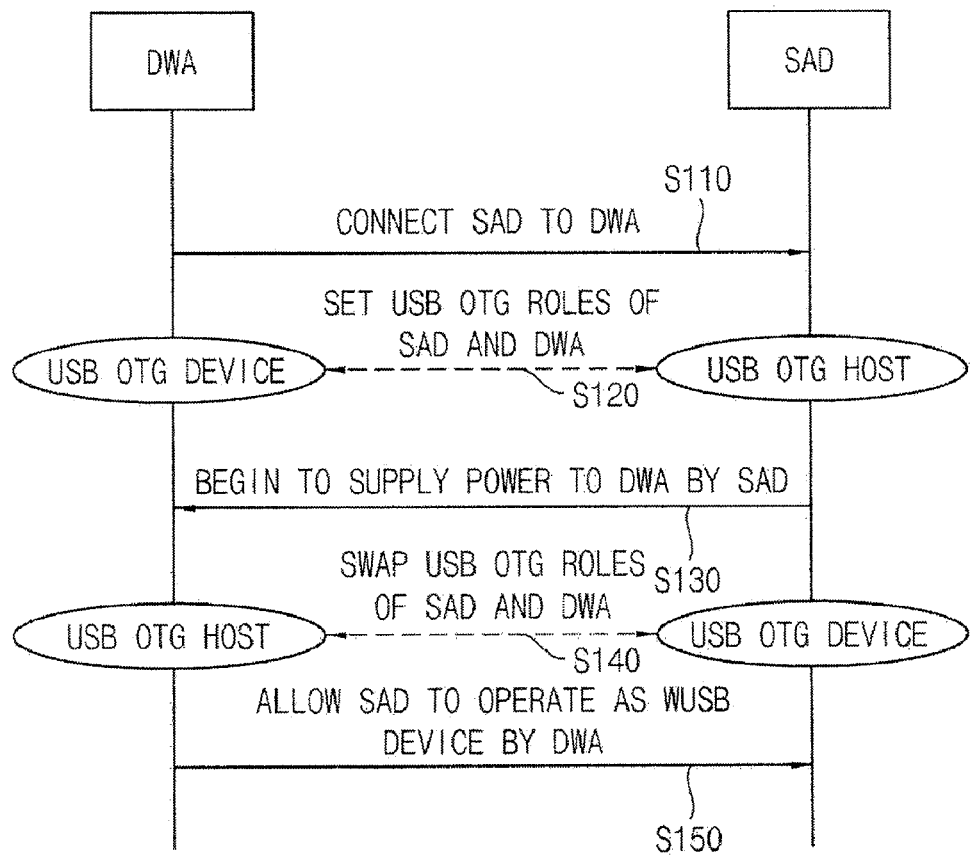
FIG. 1 is a flow chart illustrating a method of supplying power for a device wired adapter (DWA) according to an exemplary embodiment of the inventive concept.

Various exemplary embodiments of the inventive concept will be described more fully hereinafter with reference to the accompanying drawings, in which exemplary embodiments are shown. The present inventive concept may, however, be embodied in many different forms and should not be construed as limited to the exemplary embodiments set forth herein. Rather, these exemplary embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below may be described a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular exemplary embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A device wired adapter may be connected to a USB device in a wireless USB communication system to allow the USB device to operate as a wireless USB device. According to exemplary embodiments, the device wired adapter is allowed to operate without an external power source (e.g., an internal battery or an electrical outlet) by sharing power of the stand-alone USB device connected to the device wired adapter. A stand-alone USB device is a USB device having an internal battery. For example, a stand-alone USB device may include, but is not limited to, a portable multimedia player (PMP), a personal digital assistant (PDA), or a cellular phone. A non-stand-alone USB device is a USB device having no internal battery. For example, a non-stand-alone USB device may include, but is not limited to, a keyboard, a joystick, or a USB memory card. Hereinafter, the method of supplying power for the device wired adapter will be described in detail.

FIG. 1 is a flow chart illustrating a method of supplying power for a device wired adapter according to an exemplary embodiment of the inventive concept.

Referring to FIG. 1, a stand-alone USB device (SAD) may be connected to the device wired adapter so that the stand-alone USB device may operate as a wireless USB (WUSB) device (Step S110). USB on-the-go (OTG) roles of the stand-alone USB device and the device wired adapter may be set (Step S120). Power may be supplied to the device wired adapter by the stand-alone USB device (Step S130). The USB on-the-go role of the device wired adapter is then swapped with the USB on-the-go role of the stand-alone USB device (Step S140). The device wired adapter provides a wireless communication path between the stand-alone USB device and a wireless USB host, allowing the stand-alone USB device to operate as the wireless USB device (Step S150).

When the stand-alone USB device is connected to the device wired adapter (Step S110), the USB on-the-go role of the stand-alone USB device and the USB on-the-go role of the device wired adapter are set (Step S120). For example, the stand-alone USB device is set as the USB on-the-go host, and the device wired adapter is set as the USB on-the-go device. The USB on-the-go roles are set by a USB on-the-go interface. According to the USB on-the-go interface, the USB on-the-go roles of the stand-alone USB device and the device wired adapter are set based on USB connection tabs of the stand-alone USB device and the device wired adapter. After the USB on-the-go roles are set by the USB on-the-go interface, power is supplied to the device wired adapter by the stand-alone USB device (Step S130). According to the USB on-the-go interface, a power feeder and a power recipient are set based on the USB on-the-go roles in an initial connection phase. For example, a USB on-the-go host in the initial connection phase is set as the power feeder, and a USB on-the-go device in the initial connection phase is set as the power recipient. As a result, the stand-alone USB device is set as the power feeder, and the device wired adapter is set as the power recipient.

After the stand-alone USB device begins to supply power to the device wired adapter, the USB on-the-go role of the device wired adapter is swapped with the USB on-the-go role of the stand-alone USB device (Step S140). For example, the USB on-the-go role of the device wired adapter is changed from the USB on-the-go device to the USB on-the-go host, and the USB on-the-go role of the stand-alone USB device is changed from the USB on-the-go host to the USB on-the-go device. The USB on-the-go roles of the device wired adapter and the stand-alone USB device are swapped because the USB on-the-go host can control the USB on-the-go device according to the USB on-the-go interface. After the USB on-the-go roles of the device wired adapter and the stand-alone USB device are swapped, the device wired adapter provides a wireless communication path between the stand-alone USB device and a wireless USB host, allowing the stand-alone USB device to operate as the wireless USB device (Step S150). The stand-alone USB device continues to supply power to the device wired adapter after the USB on-the-go roles of the device wired adapter and the stand-alone USB device are swapped.

Figure 2:
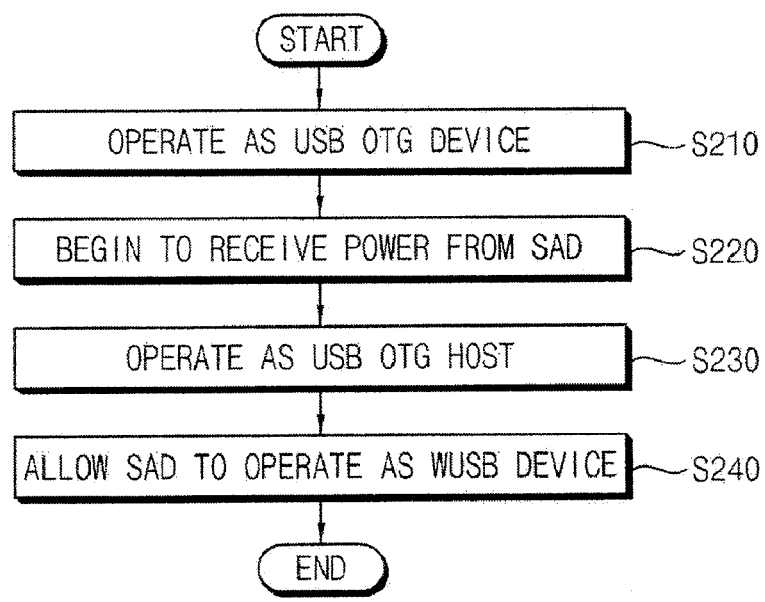
FIG. 2 is a flow chart illustrating an exemplary operation of a device wired adapter (DWA) according to the method illustrated in FIG. 1.

FIG. 2 is a flow chart illustrating an exemplary operation of a device wired adapter according to the method illustrated in FIG. 1.

Referring to FIG. 2, the device wired adapter (DWA) may operate as the USB on-the-go (OTG) device (Step S210) when the device wired adapter is connected to the stand-alone USB device (SAD). Once connected, the device wired adapter may begin to receive power from the stand-alone USB device (Step S220). The device wired adapter may operate as the USB on-the-go host (Step S230) after the USB on-the-go roles of the device wired adapter and the stand-alone USB device are swapped. The device wired adapter may provide a wireless communication path between the stand-alone USB device and a wireless USB host, allowing the stand-alone USB device to operate as the wireless USB device (WUSB) (Step S240). This process is described in more detail below.

The device wired adapter operates as the USB on-the-go device (Step S210) in an initial connection phase upon being connected to the stand-alone USB device. The device wired adapter and the stand-alone USB device are set as the USB on-the-go device and the USB on-the-go host, respectively, when the device wired adapter is connected to the stand-alone USB device. The USB on-the-go roles are set by a USB on-the-go interface. According to the USB on-the-go interface, the USB on-the-go roles of the stand-alone USB device and the device wired adapter are set based on USB connection tabs of the stand-alone USB device and the device wired adapter. The device wired adapter begins to receive power from the stand-alone USB device (Step S220). According to the USB on-the-go interface, a power feeder and a power recipient are set based on the USB on-the-go roles in the initial connection phase. As a result, the stand-alone USB device is set as the power feeder, and the device wired adapter is set as the power recipient. Once the stand-alone USB device begins to supply power to the device wired adapter, the USB on-the-go roles of the stand-alone USB device and the device wired adapter are swapped, and the device wired adapter operates as the USB on-the-go host (Step S230). After the USB on-the-go role of the device wired adapter is changed from the USB on-the-go device to the USB on-the-go host, the device wired adapter provides a wireless communication path between the stand-alone USB device and a wireless USB host, allowing the stand-alone USB device to operate as the wireless USB (WUSB) device (Step S240). As a result, the stand-alone USB device can communicate wirelessly with the wireless USB host (e.g., a computer, a laptop, etc.). As described above, the device wired adapter continues to receive power from the stand-alone USB device after the USB on-the-go roles of the device wired adapter and the stand-alone USB device are swapped, since the power feeder and the power recipient are set based on the USB on-the-go roles of the initial connection phase.

Figure 3:
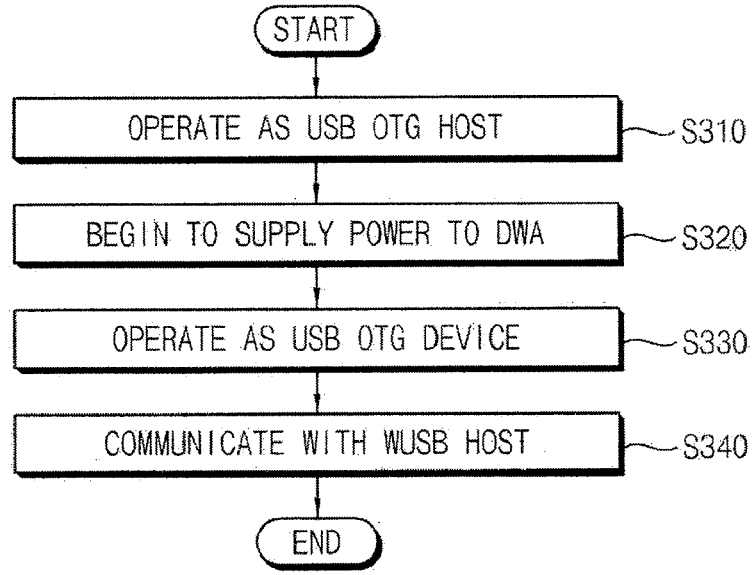
FIG. 3 is a flow chart illustrating an exemplary operation of a stand-alone USB device according to the method illustrated in FIG. 1.

FIG. 3 is a flow chart illustrating an exemplary operation of a stand-alone USB device according to the method illustrated in FIG. 1.

Referring to FIG. 3, the stand-alone USB device (SAD) may operate as the USB on-the-go (OTG) host (Step S310) when the stand-alone USB device is connected to the device wired adapter (DWA). Once connected, the stand-alone USB device may begin to supply power to the device wired adapter (Step S320). The stand-alone USB device may operate as the USB on-the-go device (Step S330) after the USB on-the-go roles of the device wired adapter and the stand-alone USB device are swapped. The stand-alone USB device may communicate with the wireless USB (WUSB) host (Step S340). This process is described in more detail below.

The stand-alone USB device operates as the USB on-the-go host (Step S310) when the stand-alone USB device is connected to the device wired adapter. For example, the device wired adapter and the stand-alone USB device are set as the USB on-the-go device and the USB on-the-go host, respectively, when the stand-alone USB device is connected to the device wired adapter. The USB on-the-go roles are set by a USB on-the-go interface. According to the USB on-the-go interface, the USB on-the-go roles of the stand-alone USB device and the device wired adapter are set based on USB connection tabs of the stand-alone USB device and the device wired adapter. The stand-alone USB device begins to supply power to the device wired adapter (Step S320). According to the USB on-the-go interface, a power feeder and a power recipient are set based on the USB on-the-go roles in the initial connection phase. As a result, the stand-alone USB device is set as the power feeder, and the device wired adapter is set as the power recipient. Once the stand-alone USB device begins to supply power to the device wired adapter, the USB on-the-go roles of the device wired adapter and the stand-alone USB device are swapped, and the stand-alone USB device operates as the USB on-the-go device (Step S330). After the USB on-the-go role of the device wired adapter is changed from the USB on-the-go device to the USB on-the-go host, the device wired adapter provides a wireless communication path between the stand-alone USB device and a wireless USB host, allowing the stand-alone USB device to operate as the wireless USB device (Step S340). As described above, the stand-alone USB device continues to supply power to the device wired adapter after the USB on-the-go roles of the device wired adapter and the stand-alone USB device are swapped, since the power feeder and the power recipient are set based on the USB on-the-go roles of the initial connection phase.

Figure 4:
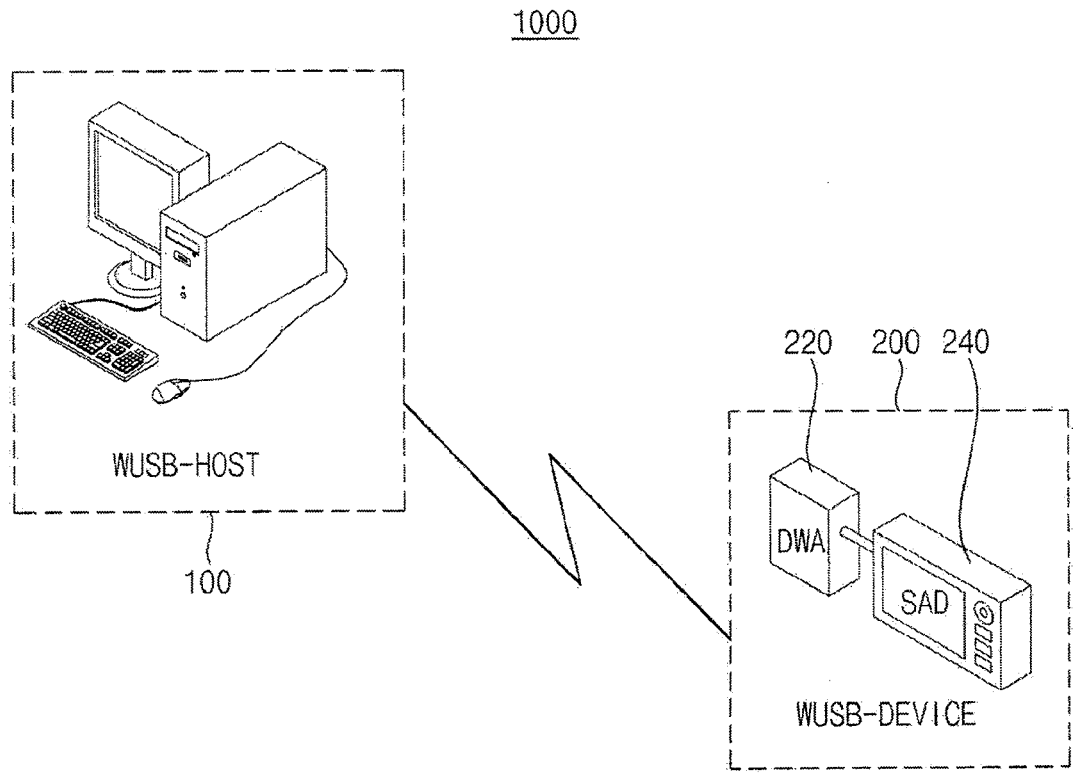
FIG. 4 is a diagram illustrating a wireless USB communication system according to an exemplary embodiment of the inventive concept.

FIG. 4 is a diagram illustrating a wireless USB communication system according to an exemplary embodiment of the inventive concept.

Referring to FIG. 4, the wireless USB (WUSB) communication system 1000 may include a wireless USB (WUSB) host 100 and a wireless USB (WUSB) device 200. A stand-alone USB device (SAD) 240 may operate as the wireless USB device 200 when the stand-alone USB device 240 is connected to a device wired adapter (DWA) 220. This system is described in more detail below.

The wireless USB host 100 communicates wirelessly with the wireless USB device 200 in the wireless USB communication system 1000. The stand-alone USB device 240 operates as the wireless USB device 200 when the stand-alone USB device 240 is connected to the device wired adapter 220. As described above, the USB on-the-go interface sets the stand-alone USB device 240 as a USB on-the-go host, and the device wired adapter 220 as a USB on-the-go device when the stand-alone USB device 240 is connected to the device wired adapter 220. In the initial connection phase, the USB on-the-go host is set as the power feeder, and the USB on-the-go device is set as the power recipient. Once connected, the stand-alone USB device 240 begins to supply power to the device wired adapter 220. The USB on-the-go role of the device wired adapter 220 is swapped with the USB on-the-go role of the stand-alone USB device 240 so that the USB on-the-go role of the device wired adapter 220 is the USB on-the-go host and the USB on-the-go role of the stand-alone USB device 240 is the USB on-the-go device. The stand-alone USB device 240 continues to supply power to the device wired adapter 220 after the USB on-the-go roles are swapped. As a result, the device wired adapter 220 can allow the stand-alone USB device 240 to operate as the wireless USB device 200. As shown in FIG. 4, the device wired adapter 220 operates as a wireless USB dongle having one port, so that the device wired adapter 220 can allow the stand-alone USB device 240 to operate as the wireless USB device 200. Although FIG. 4 illustrates the device wired adapter 220 having one port for a connection to the stand-alone USB device 240, the number of port is not limited thereto. For example, the device wired adapter 220 may have a plurality of ports, allowing the device wired adapter 220 to be connected to a plurality of stand-alone USB devices.

Figure 5:
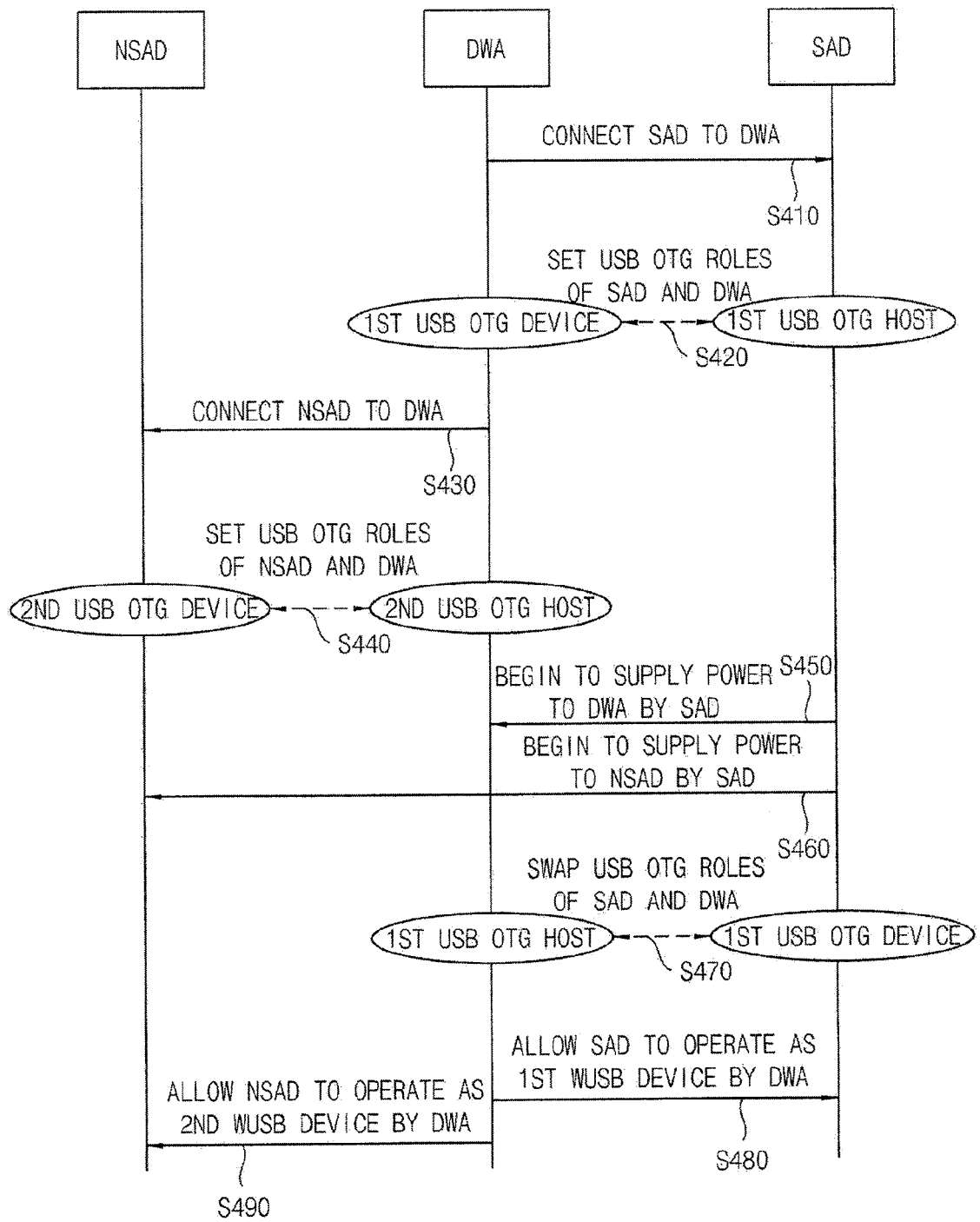
FIG. 5 is a flow chart illustrating a method of supplying power for a device wired adapter (DWA) according to an exemplary embodiment of the inventive concept.

FIG. 5 is a flow chart illustrating a method of supplying power for a device wired adapter according to an exemplary embodiment.

Referring to the method of supplying power for the device wired adapter (DWA) illustrated in FIG. 5, a stand-alone USB device (SAD) may be connected to the device wired adapter, allowing the stand-alone USB device to operate as a first wireless USB (WUSB) device (Step S410). USB on-the-go (OTG) roles of the stand-alone USB device and the device wired adapter may be set (Step S420). A non-stand-alone USB device (NSAD) may be connected to the device wired adapter, allowing the non-stand-alone USB device to operate as a second wireless USB device (Step S430). USB on-the-go roles of the non-stand-alone USB device and the device wired adapter may be set (Step S440). Power may be supplied to the device wired adapter by the stand-alone USB device (Step S450). Power may be supplied to the non-stand-alone USB device through the device wired adapter by the stand-alone USB device (Step S460). The USB on-the-go role of the device wired adapter is swapped with the USB on-the-go role of the stand-alone USB device (Step S470). The device wired adapter provides a wireless communication path between the stand-alone USB device, the non-stand-alone USB device and a wireless USB host, allowing the stand-alone USB device to operate as a first wireless USB device (Step S480) and the non-stand-alone USB device to operate as a second wireless USB device (Step S490). This system is described in more detail below.

As described above, the device wired adapter may be connected to a USB device used in a wireless USB communication system to allow the USB device to operate as a wireless USB device. A USB device may be one of two types: a stand-alone USB device and a non-stand-alone USB device. A stand-alone USB device is a USB device having an internal battery (e.g. a portable media player (PMP), a personal digital assistant (PDA), a cellular phone, etc). A non-stand-alone USB device is a USB device having no internal battery (e.g., a keyboard, a joystick, a USB memory card, etc.). In the method of supplying power for the device wired adapter shown in FIG. 5, the device wired adapter is allowed to operate without an external power source (e.g., an internal battery or a connection to an electrical outlet) by sharing power of the stand-alone USB device connected to the device wired adapter. In addition, the non-stand-alone USB device is allowed to operate without an external power source by sharing power of the stand-alone USB device connected to the device wired adapter. The method of supplying power for the device wired adapter is described in more detail below.

When the stand-alone USB device is connected to the device wired adapter (Step S410), the USB on-the-go roles of the stand-alone USB device and the device wired adapter are set (Step S420). For example, the stand-alone USB device is set as the first USB on-the-go host, and the device wired adapter is set as the first USB on-the-go device. The USB on-the-go roles are set by a USB on-the-go interface. According to the USB on-the-go interface, the USB on-the-go roles of the stand-alone USB device and the device wired adapter are set based on USB connection tabs of the stand-alone USB device and the device wired adapter. When the non-stand-alone USB device is connected to the device wired adapter (Step S430), the USB on-the-go roles of the non-stand-alone USB device and the device wired adapter are set (Step S440). For example, the non-stand-alone USB device is set as the second USB on-the-go device, and the device wired adapter is set as the second USB on-the-go host. The USB on-the-go roles are set by the USB on-the-go interface. According to the USB on-the-go interface, the USB on-the-go roles of the non-stand-alone USB device and the device wired adapter are set based on USB connection tabs of the non-stand-alone USB device and the device wired adapter.

After the USB on-the-go roles of the stand-alone USB device and the device wired adapter are set by the USB on-the-go interface, power is supplied to the device wired adapter by the stand-alone USB device (Step S450). In addition, after the USB on-the-go roles of the non-stand-alone USB device and the device wired adapter are set by the USB on-the-go interface, power is supplied to the non-stand-alone USB device through the device wired adapter by the stand-alone USB device (Step S460). According to the USB on-the-go interface, a power feeder and a power recipient are set based on the USB on-the-go roles in an initial connection phase. For example, a USB on-the-go host in the initial connection phase is set as the power feeder, and a USB on-the-go device in the initial connection phase is set as the power recipient. As a result, the stand-alone USB device is set as the power feeder, and the device wired adapter is set as the power recipient. In addition, the non-stand-alone USB device is set as the power recipient, and the device wired adapter is set as the power feeder. After the stand-alone USB device begins to supply power to the device wired adapter and the non-stand-alone USB device through the device wired adapter, the USB on-the-go role of the device wired adapter is swapped with the USB on-the-go role of the stand-alone USB device (Step S470). For example, the USB on-the-go role of the device wired adapter is changed from the first USB on-the-go device to the first USB on-the-go host, and the USB on-the-go role of the stand-alone USB device is changed from the first USB on-the-go host to the first USB on-the-go device.

Once the USB on-the-go roles of the device wired adapter and the stand-alone USB device are swapped, the device wired adapter provides a wireless communication path between the stand-alone USB device, the non-stand-alone USB device and a wireless USB host, allowing the stand-alone USB device to operate as the first wireless USB device (Step S480). In addition, the device wired adapter allows the non-stand-alone USB device to operate as the second wireless USB device (Step S490) because the device wired adapter operates as the second USB on-the-go host while the non-stand-alone USB device operates as the second USB on-the-go device. The stand-alone USB device continues to supply power to the device wired adapter and the non-stand-alone USB device via the device wired adapter after the USB on-the-go roles of the device wired adapter and the stand-alone USB device are swapped. Although FIG. 5 illustrates connecting the non-stand-alone USB device to the device wired adapter after the stand-alone USB device is connected to the device wired adapter, a connection order of the stand-alone USB device and the non-stand-alone USB device is not limited thereto.

Figure 6:
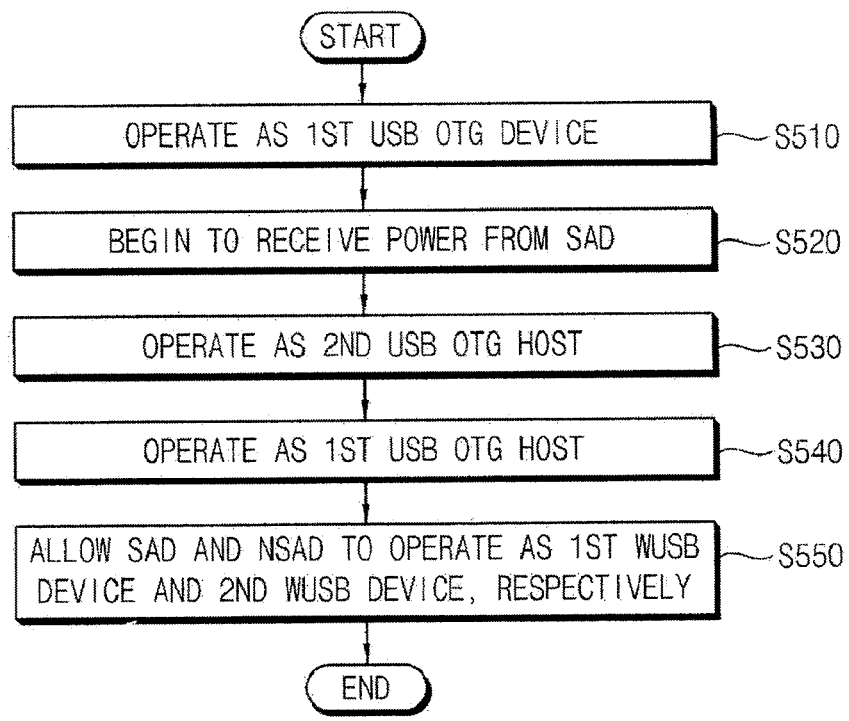
FIG. 6 is a flow chart illustrating an exemplary operation of a device wired adapter (DWA) according to the method illustrated in FIG. 5.

FIG. 6 is a flow chart illustrating an exemplary operation of a device wired adapter according to the method illustrated in FIG. 5.

Referring to FIG. 6, the device wired adapter (DWA) may operate as the first USB on-the-go (OTG) device (Step S510) when the device wired adapter is connected to the stand-alone USB device (SAD). The device wired adapter may begin to receive power from the stand-alone USB device (Step S520). The device wired adapter may operate as the second USB on-the-go host (Step S530) when the device wired adapter is connected to the non-stand-alone USB device (NSAD). The device wired adapter may operate as the first USB on-the-go host (Step S540) after the USB on-the-go roles of the device wired adapter and the stand-alone USB device are swapped. The device wired adapter provides a wireless communication path between the stand-alone USB device, the non-stand-alone USB device and a wireless USB host, allowing the stand-alone USB device and the non-stand-alone USB device to operate as the first wireless USB (WUSB) device and the second wireless USB device, respectively (Step S550). This process is described in more detail below.

The device wired adapter operates as the first USB on-the-go device (Step S510) when the device wired adapter is connected to the stand-alone USB device. For example, the device wired adapter and the stand-alone USB device are set as the first USB on-the-go device and the first USB on-the-go host, respectively, when the device wired adapter is connected to the stand-alone USB device. The USB on-the-go roles are set by a USB on-the-go interface. According to the USB on-the-go interface, the USB on-the-go roles of the stand-alone USB device and the device wired adapter are set based on USB connection tabs of the stand-alone USB device and the device wired adapter. The device wired adapter begins to receive power from the stand-alone USB device (Step S520). According to the USB on-the-go interface, a power feeder and a power recipient are set based on the USB on-the-go roles in the initial connection phase. As a result, the stand-alone USB device is set as the power feeder, and the device wired adapter is set as the power recipient. The device wired adapter operates as the second USB on-the-go host when the device wired adapter is connected to the non-stand-alone USB device (Step S530). According to the USB on-the-go interface, the USB on-the-go roles of the non-stand-alone USB device and the device wired adapter are set based on the USB connection tabs of the non-stand-alone USB device and the device wired adapter. The non-stand-alone USB device begins to receive power through the device wired adapter because the non-stand-alone USB device is set as the power recipient, and the device wired adapter is set as the power feeder.

The device wired adapter operates as the first USB on-the-go host (Step S540) after the USB on-the-go roles of the device wired adapter and the stand-alone USB device are swapped. For example, the USB on-the-go role of the device wired adapter is swapped with the USB on-the-go role of the stand-alone USB device after the stand-alone USB device begins to supply power to the device wired adapter and the non-stand-alone USB device. After the USB on-the-go role of the device wired adapter is changed from the USB on-the-go device to the USB on-the-go host, the device wired adapter provides a wireless communication path between the stand-alone USB device, the non-stand-alone USB device and a wireless USB host, allowing the stand-alone USB device and the non-stand-alone USB device to operate as the first wireless USB device and the second wireless USB device, respectively (Step S550). As a result, the stand-alone USB device can communicate wirelessly with a wireless USB host (e.g., a computer, a laptop, etc.). As described above, because the power feeder and the power recipient are set based on the USB on-the-go roles in the initial connection phase, the device wired adapter and the non-stand-alone USB device continue to receive power from the stand-alone USB device after the USB on-the-go roles of the device wired adapter and the stand-alone USB device are swapped.

Figure 7:
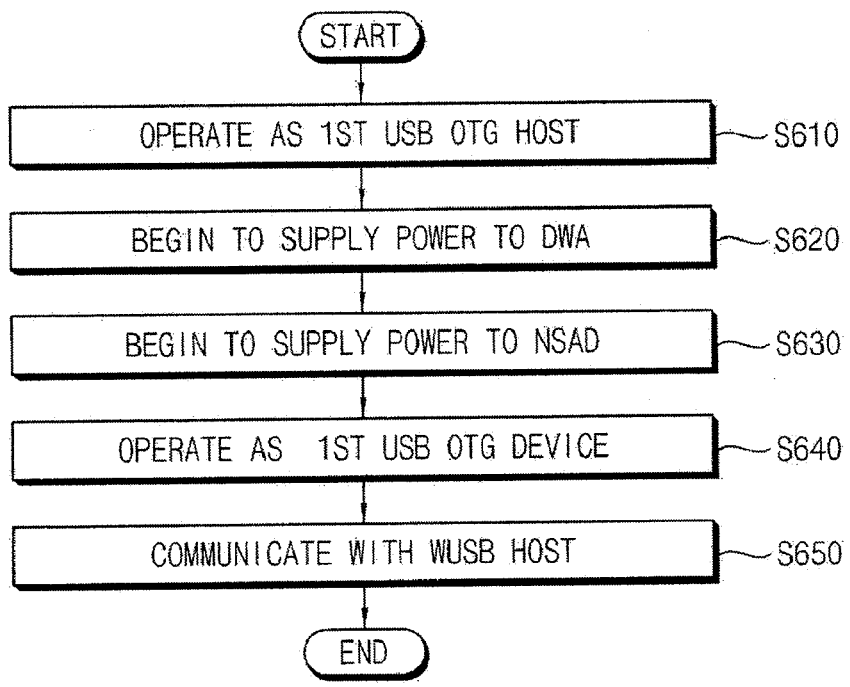
FIG. 7 is a flow chart illustrating an exemplary operation of a stand-alone USB device according to the method illustrated in FIG. 5.

FIG. 7 is a flow chart illustrating an exemplary operation of a stand-alone USB device according to the method illustrated in FIG. 5.

Referring to FIG. 7, the stand-alone USB device (SAD) may operate as the first USB on-the-go (OTG) host (Step S610) when the stand-alone USB device is connected to the device wired adapter (DWA). Once connected, the stand-alone USB device may begin to supply power to the device wired adapter (Step S620). The stand-alone USB device may begin to supply power to the non-stand-alone USB device (NSAD) through the device wired adapter (Step S630). The stand-alone USB device may operate as the first USB on-the-go device (Step S640) after the USB on-the-go roles of the device wired adapter and the stand-alone USB device are swapped, allowing the stand-alone USB device to communicate with the wireless USB (WUSB) host (Step S650). This process is described in more detail below.

The stand-alone USB device operates as the first USB on-the-go host (Step S610) when the stand-alone USB device is connected to the device wired adapter. For example, the device wired adapter and the stand-alone USB device are set as the first USB on-the-go device and the first USB on-the-go host, respectively when the stand-alone USB device is connected to the device wired adapter. The USB on-the-go roles are set by a USB on-the-go interface. According to the USB on-the-go interface, the USB on-the-go roles of the stand-alone USB device and the device wired adapter are set based on USB connection tabs of the stand-alone USB device and the device wired adapter. The stand-alone USB device begins to supply power to the device wired adapter (Step S620). According to the USB on-the-go interface, a power feeder and a power recipient are set based on the USB on-the-go roles in the initial connection phase. As a result, the stand-alone USB device is set as the power feeder, and the device wired adapter is set as the power recipient. The non-stand-alone USB device operates as the second USB on-the-go device when the non-stand-alone USB device is connected to the device wired adapter. The stand-alone USB device begins to supply power to the non-stand-alone USB device through the device wired adapter (Step S630). The USB on-the-go roles of the device wired adapter and the stand-alone USB device are swapped and the stand-alone USB device operates as the first USB on-the-go device (Step S640). After the USB on-the-go role of the device wired adapter is changed from the first USB on-the-go device to the first USB on-the-go host, the device wired adapter provides a wireless communication path between the stand-alone USB device and a wireless USB host, allowing the stand-alone USB device to operate as the wireless USB device and communicate with the wireless USB host (Step S650). As described above, the stand-alone USB device continues to supply power to the device wired adapter and the non-stand-alone USB device through the device wired adapter after the USB on-the-go roles of the device wired adapter and the stand-alone USB device are swapped, since the power feeder and the power recipient are set based on the USB on-the-go roles of the initial connection phase.

Figure 8:
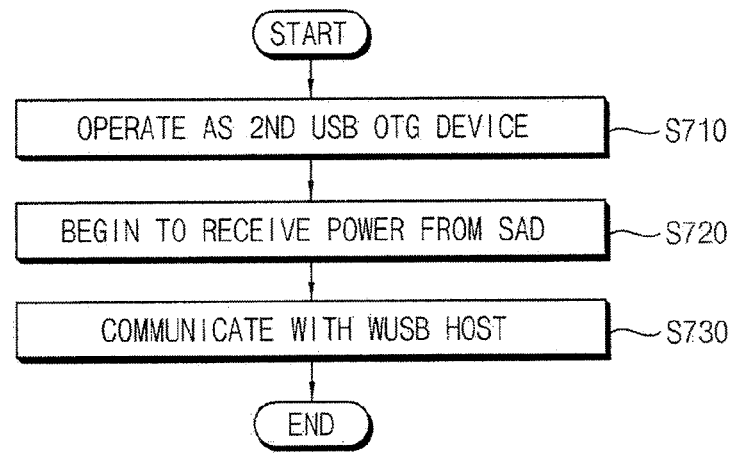
FIG. 8 is a flow chart illustrating an exemplary operation of a non-stand-alone USB device according to the method illustrated in FIG. 5.

FIG. 8 is a flow chart illustrating an exemplary operation of a non-stand-alone USB device according to the method illustrated in FIG. 5.

Referring to FIG. 8, the non-stand-alone USB device (NSAD) may operate as the second USB on-the-go (OTG) device (Step S710) when the non-stand-alone USB device is connected to the device wired adapter (DWA). The non-stand-alone USB device may begin to receive power from the stand-alone USB device (SAD) through the device wired adapter (Step S720). The non-stand-alone USB device may communicate with the wireless USB (WUSB) host (Step S730). This process is described below in more detail.

The non-stand-alone USB device operates as the second USB on-the-go device (Step S710) when the non-stand-alone USB device is connected to the device wired adapter. According to a USB on-the-go interface, the USB on-the-go roles of the non-stand-alone USB device and the device wired adapter are set based on USB connection tabs of the non-stand-alone USB device and the device wired adapter. In addition, a power feeder and a power recipient are set based on the USB on-the-go roles in the initial connection phase. The non-stand-alone USB device is set as the power recipient, and the device wired adapter is set as the power feeder. As a result, the non-stand-alone USB device begins to receive power from the stand-alone USB device through the device wired adapter (Step S720). The USB on-the-go roles of the device wired adapter and the stand-alone USB device are swapped and the non-stand-alone USB device communicates with the wireless USB (WUSB) host (Step S730). As described above, the non-stand-alone USB device continues to receive power from the stand-alone USB device through the device wired adapter after the USB on-the-go roles of the device wired adapter and the stand-alone USB device are swapped, since the power feeder and the power recipient are set based on the USB on-the-go roles of the initial connection phase.

Figure 9:
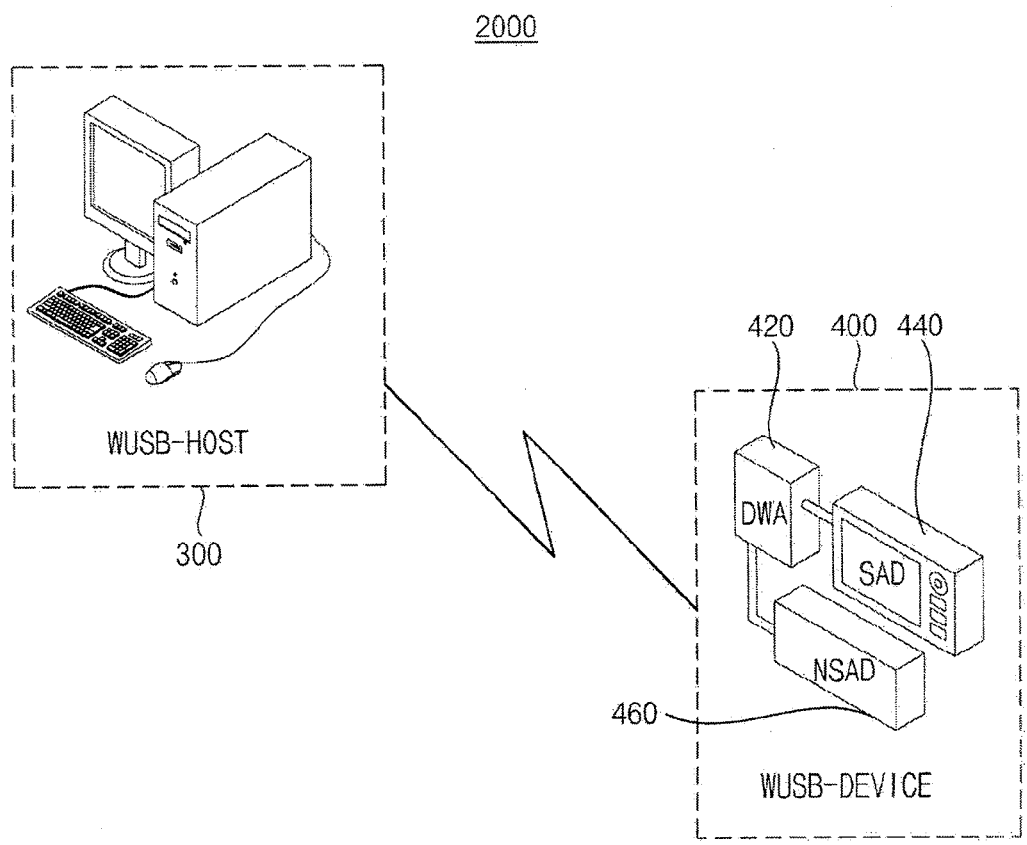
FIG. 9 is a diagram illustrating a wireless USB communication system according to an exemplary embodiment of the inventive concept.

FIG. 9 is a diagram illustrating a wireless USB (WUSB) communication system according to an exemplary embodiment of the inventive concept.

Referring to FIG. 9, the wireless USB (WUSB) communication system 2000 may include a wireless USB host 300 and a wireless USB device 400. A stand-alone USB device (SAD) 440 and a non-stand-alone USB device (NSAD) 460 may operate as the wireless USB device 400 when the stand-alone USB device 440 and the non-stand-alone USB device 460 are connected to a device wired adapter (DWA) 420.

The wireless USB host 300 communicates wirelessly with the wireless USB device 400 in the wireless USB communication system 2000. The wireless USB device 400, as shown in FIG. 9, corresponds to either a first wireless USB device or a second wireless USB device, based on whether the stand-alone USB device 440 or the non-stand-alone USB device 460 is communicating wirelessly with the wireless USB host 300. For example, the stand-alone USB device 440 operates as the first wireless USB device 400 when the stand-alone USB device 440 is connected to the device wired adapter 420. As described above, the USB on-the-go interface sets the stand-alone USB device 440 as a first USB on-the-go host, and the device wired adapter 420 as a first USB on-the-go device when the stand-alone USB device 440 is connected to the device wired adapter 420. The non-stand-alone USB device 460 operates as the second wireless USB device 400 when the non-stand-alone USB device 460 is connected to the device wired adapter 420. As described above, the USB on-the-go interface sets the non-stand-alone USB device 460 as a second USB on-the-go device, and the device wired adapter 420 as a second USB on-the-go host when the non-stand-alone USB device 460 is connected to the device wired adapter 420. As a result, the stand-alone USB device 440 begins to supply power to the device wired adapter 420 and the non-stand-alone USB device 460 because a power feeder and a power recipient are set based on the USB on-the-go roles in an initial connection phase. The USB on-the-go role of the device wired adapter 420 is swapped with the USB on-the-go role of the stand-alone USB device 440. The stand-alone USB device 440 continues to supply power to the device wired adapter 420 and the non-stand-alone USB device 460 after the USB on-the-go roles of the device wired adapter 420 and the stand-alone USB device 440 are swapped. As a result, the device wired adapter 420 can allow the stand-alone USB device 440 and the non-stand-alone USB device 460 to operate as the first wireless USB device 400 and second wireless USB device 400, respectively. Although FIG. 9 shows the device wired adapter 420 having two ports for connections with the stand-alone USB device 440 and the non-stand-alone USB device 460, the number of ports is not limited thereto. For example, the device wired adapter 420 may have a plurality of ports, allowing the device wired adapter 420 to be connected to a plurality of stand-alone USB devices and/or a plurality of non-stand-alone USB devices.

The foregoing is illustrative of exemplary embodiments and is not to be construed as limiting thereof. Although exemplary embodiments have been described, those skilled in the art will readily appreciate that modifications may be made to the exemplary embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A method of supplying power for a device wired adapter, comprising:
   connecting a stand-alone universal serial bus (USB) device to the device wired adapter, wherein the stand-alone USB device operates as a wireless USB device, and the device wired adapter wirelessly transmits data between the stand-alone USB device and a wireless USB host;
   setting the stand-alone USB device as a USB on-the-go host, and the device wired adapter as a USB on-the-go device;
   supplying power to the device wired adapter by the stand-alone USB device; and
   swapping a USB on-the-go role of the device wired adapter with a USB on-the-go role of the stand-alone USB device,
   wherein the device wired adapter concurrently receives power from the stand-alone USB device via a wired connection and provides a wireless communication path between the stand-alone USB device and the wireless USB host.

2. The method of claim 1, wherein swapping the USB on-the-go role of the device wired adapter with the USB on-the-go role of the stand-alone USB device comprises:
   changing the USB on-the-go role of the device wired adapter from the USB on-the-go device to the USB on-the-go host; and
   changing the USB on-the-go role of the stand-alone USB device from the USB on-the-go host to the USB on-the-go device.

3. The method of claim 2, wherein the stand-alone USB device continues to supply power to the device wired adapter after the USB on-the-go role of the device wired adapter is swapped with the USB on-the-go role of the stand-alone USB device.

4. The method of claim 1, further comprising:
   controlling the USB on-the-go device, by the USB on-the-go host, according to a USB on-the-go interface.

5. A method of supplying power for a device wired adapter, comprising:
   connecting a stand-alone universal serial bus (USB) device to the device wired adapter, wherein the stand-alone USB device operates as a first wireless USB device, and the device wired adapter wirelessly transmits first data between the stand-alone USB device and a wireless USB host;
   setting the stand-alone USB device as a first USB on-the-go host, and the device wired adapter as a first USB on-the-go device;
   connecting a non-stand-alone USB device to the device wired adapter, wherein the non-stand-alone USB device operates as a second wireless USB device, and the device wired adapter wirelessly transmits second data between the non-stand-alone USB device and the wireless USB host;
   setting the non-stand-alone USB device as a second USB on-the-go device, and the device wired adapter as a second USB on-the-go host;

supplying power to the device wired adapter and the non-stand-alone USB device by the stand-alone USB device; and swapping a USB on-the-go role of the device wired adapter with a USB on-the-go role of the stand-alone USB device, wherein the device wired adapter concurrently receives power from the stand-alone USB device via a wired connection and provides a wireless communication path between the stand-alone USB device and the wireless USB host, and the non-stand-alone USB device and the wireless USB host.

6. The method of claim 5, further comprising:

controlling the first USB on-the-go device, by the first USB on-the-go host, according to a USB on-the-go interface; and controlling the second USB on-the-go device, by the second USB on-the-go host, according to the USB on-the-go interface.

7. The method of claim 5, wherein swapping the USB on-the-go role of the device wired adapter with the USB on-the-go role of the stand-alone USB device comprises:

changing the USB on-the-go role of the device wired adapter from the first USB on-the-go device to the first USB on-the-go host; and changing the USB on-the-go role of the stand-alone USB device from the first USB on-the-go host to the first USB on-the-go device.

8. The method of claim 7, wherein the stand-alone USB device continues to supply power to the device wired adapter and the non-stand-alone USB device after the USB on-the-go role of the device wired adapter is swapped with the USB on-the-go role of the stand-alone USB device.

9. A wireless universal serial bus (USB) communication system, comprising:

a device wired adapter configured to wirelessly transmit data between a stand-alone USB device and a wireless USB host;

the wireless USB host configured to wirelessly communicate with a first wireless USB device and a second wireless USB device; and the stand-alone USB device configured to operate as the first wireless USB device while connected to the device wired adapter by a USB on-the-go interface and while the device wired adapter is set as a first USB on-the-go host and the stand-alone USB device is set as a first USB on-the-go device, and further configured to supply power to the device wired adapter upon the USB on-the-go interface setting the stand-alone USB device as the first USB on-the-go host and the device wired adapter as the first USB on-the-go device, wherein the device wired adapter is configured to concurrently receive power from the stand-alone USB device via a wired connection and provide a wireless communication path between the stand-alone USB device and the wireless USB host.

10. The system of claim 9, wherein the USB on-the-go interface is configured to set a USB on-the-go role of the device wired adapter and a USB on-the-go role of the stand-alone USB device based on connection tabs of the device wired adapter and the stand-alone USB device.

11. The system of claim 9, wherein the USB on-the-go interface is configured to swap a USB on-the-go role of the device wired adapter with a USB on-the-go role of the stand-alone USB device upon the stand-alone USB device supplying power to the device wired adapter.

12. The system of claim 11, wherein the USB on-the-go interface is configured to swap the USB on-the-go role of the device wired adapter with the USB on-the-go role of the stand-alone USB device by changing the USB on-the-go role of the device wired adapter from the first USB on-the-go device to the first USB on-the-go host, and changing the USB on-the-go role of the stand-alone USB device from the first USB on-the-go host to the first USB on-the-go device.

13. The system of claim 12, wherein the stand-alone USB device is configured to continue to supply power to the device wired adapter after the USB on-the-go interface swaps the USB on-the-go role of the device wired adapter with the USB on-the-go role of the stand-alone USB device.

14. The system of claim 9, further comprising:

a non-stand-alone USB device, wherein the non-stand-alone USB device is configured to operate as the second wireless USB device upon being connected to the device wired adapter by the USB on-the-go interface, wherein the stand-alone USB device is configured to supply power to the non-stand-alone USB device through the device wired adapter upon the USB on-the-go interface setting the stand-alone USB device as the first USB on-the-go host, setting the non-stand-alone USB device as a second USB on-the-go device, initially setting the device wired adapter as the first USB on-the-go device, and subsequently setting the device wired adapter as a second USB on-the-go host.

15. The system of claim 14, wherein the non-stand-alone USB device comprises a USB device not having an internal battery, and the stand-alone USB device comprises a USB device having an internal battery.

16. The system of claim 14, wherein the USB on-the-go interface is configured to set the device wired adapter as the first USB on-the-go host and the stand-alone USB device as the first USB on-the-go device upon the stand-alone USB device supplying power to the non-stand-alone USB device through the device wired adapter.

17. The system of claim 16, wherein the USB on-the-go interface is configured to swap the USB on-the-go role of the device wired adapter with the USB on-the-go role of the stand-alone USB device by changing the USB on-the-go role of the device wired adapter from the first USB on-the-go device to the first USB on-the-go host, and changing the USB on-the-go role of the stand-alone USB device from the first USB on-the-go host to the first USB on-the-go device.

18. The system of claim 17, wherein the stand-alone USB device is configured to continue to supply power to the non-stand-alone USB device through the device wired adapter after the USB on-the-go interface swaps the USB on-the-go role of the device wired adapter with the USB on-the-go role of the stand-alone USB device.

* * * * *